United States Patent [19]

Sliger

[11] 4,248,374
[45] Feb. 3, 1981

[54] ENGINE COOLING SYSTEM THERMOSTAT AND METHOD OF MAKING THE SAME

[75] Inventor: Boyd P. Sliger, Concord, Tenn.

[73] Assignee: Robertshaw Controls Company, Richmond, Va.

[21] Appl. No.: 24,575

[22] Filed: Mar. 28, 1979

[51] Int. Cl.³ .......................................... G05D 23/12
[52] U.S. Cl. .................................. 236/34.5; 285/175; 403/350
[58] Field of Search ....................... 236/34, 100, 34.5; 137/454.2; 403/350, DIG. 8; 285/178, 175

[56] References Cited

U.S. PATENT DOCUMENTS

| | | | |
|---|---|---|---|
| 2,157,770 | 5/1939 | Mayo | 236/34 |
| 2,284,847 | 6/1942 | Raymond | 403/350 |
| 2,323,533 | 7/1943 | Giesler | 236/34.5 |
| 2,397,382 | 3/1946 | Smith | 403/350 |
| 2,949,692 | 8/1960 | Kuhn | 285/178 X |
| 3,173,442 | 3/1965 | McKillip | 137/454.2 X |
| 3,667,788 | 6/1972 | Greenwood | 285/178 X |

Primary Examiner—William E. Tapolcai, Jr.
Attorney, Agent, or Firm—Candor, Candor & Tassone

[57] ABSTRACT

A vehicle type thermostat having a housing provided with a valve seat that is controlled by a movable valve member is interconnected to a temperature responsive device carried by the housing, the housing having interference fit positioning abutments thereon for rotationally orienting the housing in a vehicle engine cooling system whereby the structure of the thermostat can be disposed in a desired rotational position within the engine cooling system. The housing includes a relatively short annular skirt disposed intermediate the opposed ends of the housing and having the positioning abutments thereon. The housing includes a spring retainer having an annular spring seat portion defining one of the opposed ends of the housing and having a pair of strap portions respectively extending from the spring seat portion to adjacent the annular skirt. A retaining member for positioning the thermostat in an outlet housing of an engine cooling system is secured to the strap portions.

40 Claims, 8 Drawing Figures

ENGINE COOLING SYSTEM THERMOSTAT AND METHOD OF MAKING THE SAME

BACKGROUND OF THE INVENTION

1. Field of the Invention

This invention relates to an improved vehicle type thermostat and to an engine cooling system utilizing such a thermostat as well as to methods of making such a thermostat and such an engine cooling system.

2. Prior Art Statement

It is well known that automobile type thermostats have been provided wherein each has a bypass through the thermostat leading to a conduit means for a vehicle heater so that the thermostat will not control such continuous flow of coolant to the heater.

SUMMARY OF THE INVENTION

It is a feature of this invention to provide an improved vehicle type thermostat that has means for automatically rotationally positioning the same in an outlet housing of a vehicle engine cooling system.

In particular, it was found that on some automobile engines, it is desired that a passageway to a bypass circuit or the like be supplied coolant from the water outlet housing independently of the operation of the vehicle type thermostat disposed therein. For example, in this arrangement, coolant can be circulated to the passenger cabin heater independently of the operation of the vehicle type thermostat.

Accordingly, it is one of the features of applicant's copending patent application, Ser. No. 024,576, filed Mar. 28, 1979, to provide a thermostat that can be inserted into an outlet housing of the engine cooling system and be rotated in either direction about the horizontal axis thereof until positioning means of the thermostat abut against positioning means of the outlet housing whereby an opening in the thermostat will be oriented adjacent an exit means of the outlet housing so that coolant can continuously flow to the exit means from the oriented opening of the thermostat regardless of the operation of the thermostat for its conventional purpose.

However, it was found according to the teachings of this invention that in order to make a particular housing part of the above described vehicle type thermostat, multiple handling and forming operations were required thereby adding to the cost of making such a thermostat.

Therefore, it is a feature of this invention to provide an improved vehicle type thermostat of the above type having improved housing means that will still permit rotationally orienting the housing means in a vehicle engine cooling system for the above described purpose or for other purposes as desired.

In particular, one embodiment of this invention provides a vehicle type thermostat having a housing means provided with a valve seat that is controlled by a movable valve member which is interconnected to a temperature responsive device that is carried by the housing means. The housing means has interference fit positioning means thereon for rotationally orienting the housing means in a vehicle engine cooling system whereby the thermostat can be disposed in a desired rotational position in the cooling system. The housing means includes a relatively short annular skirt disposed intermediate the opposed ends thereof and having the positioning means thereon. The housing means includes a spring retainer having an annular spring seat portion defining one of the opposed ends of the housing means and having a pair of strap portions respectively extending from the spring seat portion to adjacent the annular skirt. A retaining member for positioning the thermostat in an outlet housing of an engine cooling system is secured to the strap portions.

In this manner, it has been found that the short annular skirt of the housing means can be formed in a single forming operation and thereby will permit an automated assembly operation therewith.

Accordingly, it is an object of this invention to provide an improved vehicle type thermostat having one or more of the novel features of this invention as set forth above or hereinafter shown or described.

Another object of this invention is to provide a method of making such a vehicle type thermostat, the method of this invention having one or more of the novel features of this invention as set forth above or hereinafter shown or described.

Another object of this invention is to provide an improved vehicle engine cooling system utilizing such a thermostat, the system of this invention having one or more of the novel features of this invention as set forth above or hereinafter shown or described.

Another object of this invention is to provide a method of making such a vehicle engine cooling system, the method of this invention having one or more of the novel features of this invention as set forth above or hereinafter shown or described.

Other objects, uses or advantages of this invention are apparent from a reading of this description which proceeds with reference to the accompanying drawings forming a part thereof and wherein:

DESCRIPTION OF THE PREFERRED EMBODIMENT

While the various features of this invention are hereinafter described and illustrated as being particularly adapted to provide a vehicle type thermostat having means for rotationally positioning the same to provide a bypass flow of coolant to a passenger cabin heater of the vehicle containing the thermostat in the engine cooling system thereof, it is to be understood that the various features of this invention can be utilized singly or in any combination thereof to provide means for rotationally positioning the vehicle type thermostat for any desired purpose.

Therefore, this invention is not to be limited to only the embodiment illustrated in the drawings, because the drawings are merely utilized to illustrate one of the wide variety of uses of this invention.

Figure 1:
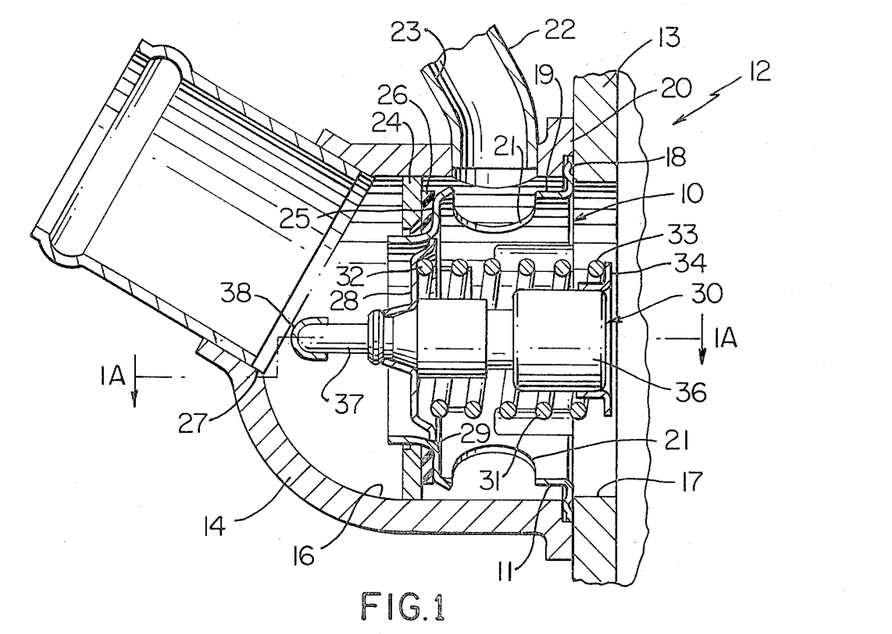
FIG. 1 is a cross-sectional view illustrating applicant's prior vehicle type thermostat disposed in a vehicle engine cooling system.
Figure 1A:
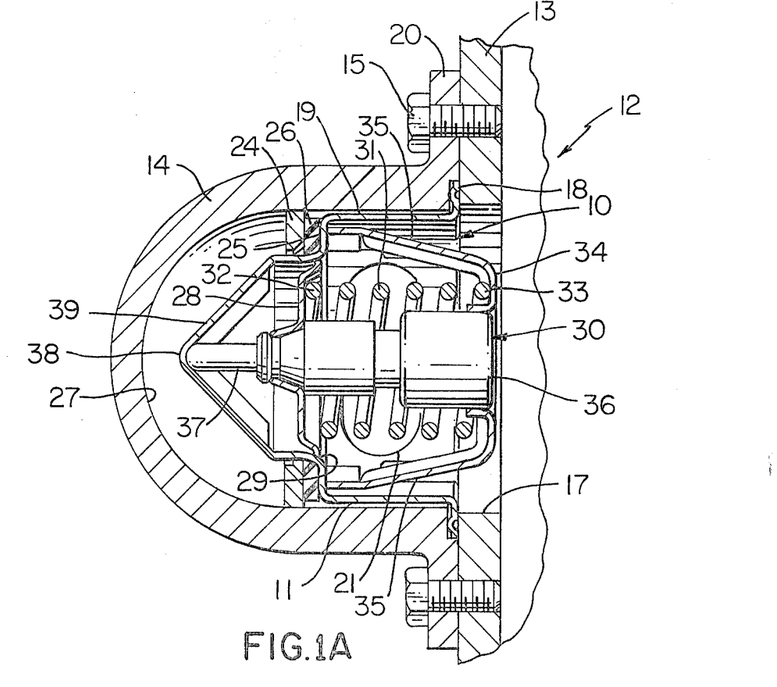
FIG. 1A is a cross-sectional view taken on line 1A—1A of FIG. 1.

Referring now to FIGS. 1 and 1A, the vehicle type thermostat of applicant's aforementioned copending patent application, Ser. No. 024,576 filed Mar. 28, 1979 is generally indicated by the reference numeral 10 and comprises a housing means 11 disposed in an engine cooling system that is generally indicated by the reference numeral 12 and comprises an engine block means 13 having an outlet housing 14 secured thereto by fastening bolts 15 (FIGS. 4 and 5) so that a passage 16 of the outlet housing 14 is in aligned relation with the opening 17 in the engine block means 13.

The housing means 11 of the thermostat 10 has an outwardly directed annular flange 18 extending from one end of a cylindrical housing section 19 thereof, the annular flange 18 being sandwiched between a stepped annular flange 20 of the outlet housing 14 and the engine block means 13 so as to hold the thermostat 10 in the rotational position illustrated in FIG. 1. In this manner, an opening 21 in the cylindrical housing section 19 is adapted to be disposed in aligned relation with a conduit means 22 carried by the outlet housing means 14 and having a passage 23 thereof intersecting with the passage 16 of the outlet housing 14 at a point intermediate the engine block means 13 and an annular shoulder 24 carried in the passage 16 of the outlet housing 14 and against which an annular shoulder 25 of the cylindrical housing section 19 of the thermostat 10 is sealed by an interposed resilient sealing gasket 26.

In this manner, the housing means 11 of the thermostat 10 is sealed to the annular shoulder 24 of the outlet housing 14 so that the coolant from the passage means 17 of the engine block means 13 cannot pass through the thermostat housing 11 to the left hand end 27 of the passage means 16 of the housing means 14 as illustrated in the drawings until a movable valve member 28 of the thermostat 10 is moved away from a valve seat surface means 29 of the cylindrical housing section 19 in a conventional manner.

For example, the movable valve member 28 is carried by a piston and cylinder type temperature responsive device that is generally indicated by the reference numeral 30 and is conventional in the art, the valve member 28 being urged to its closed position by a compression spring 31 having one end 32 bearing against the valve member 28 and the other end 33 thereof bearing against a spring retainer 34 interconnected to the housing section 19 of the housing means 11 by a pair of integral strap members 35. FIG. 1A, whereby the spring retainer 34 and its integral strap members 35 form part of the housing means 11 of the thermostat 10.

The piston and cylinder type temperature responsive device 30 has a cylinder means 36 carrying the valve member 28 while a piston 37 thereof bears against an apex 38 of a V-shaped strap 39, FIG. 1A, that is formed integral with the cylindrical section 19 of the housing means 11 as illustrated whereby upon the heating of a wax charge disposed in the cylinder means 36 to cause the wax charge to expand when the same reaches a certain temperature, the piston and cylinder device 30 causes the cylinder means 36 and, thus, the valve member 28 to move to the right in FIG. 1 in opposition to the force of the compression spring 31 to open the valve seat surface 29 in a manner well known in the art and permit some of the coolant passing through the engine block means 13 to be bypassed into the outlet housing 14 and be directed by the position 27 thereof to the engine radiator to be cooled thereby before the same is passed back to the cooling means of the engine block means 13 in a manner well known in the art. Of course, when the temperature being sensed by the device 30 falls below the predetermined temperature, the wax charge therein contracts and the compression spring 31 will move the valve member 28 to close the valve seat surface 29 and thereby prevent communication between the engine block means 13 and the portion 27 of the passage 16 of the outlet housing 14.

The cylindrical housing section 19 of the thermostat 10 has a plurality of abutments formed thereon which cooperate with the particular cross-sectional configuration of the passage 16 of the outlet housing 14 to always insure that one of the two opposed openings 21 in the cylindrical housing section 19 will be aligned with the passage 23 of the bypass conduit 22 in a manner fully disclosed and claimed in the aforementioned copending patent application.

However, as previously stated, it was found according to the teachings of this invention that the cylindrical housing section 19 of the thermostat 10 required multiple operations not only in the forming thereof, but also in the handling thereof in order to form the openings 21 thereof and the positioning abutment means thereof and thereby added to the overall cost of the thermostat.

Therefore, as previously stated, it is a feature of this invention to provide an improved thermostat that will perform the same function as the thermostat 10 previously described without requiring the costly operations necessary to form the housing section 19.

Figure 2:
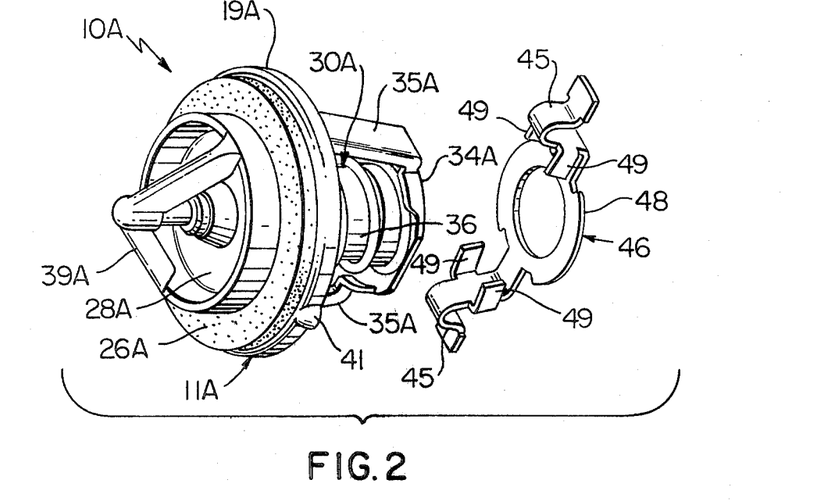
FIG. 2 is an exploded perspective view of the improved vehicle type thermostat of this invention.
Figure 3:
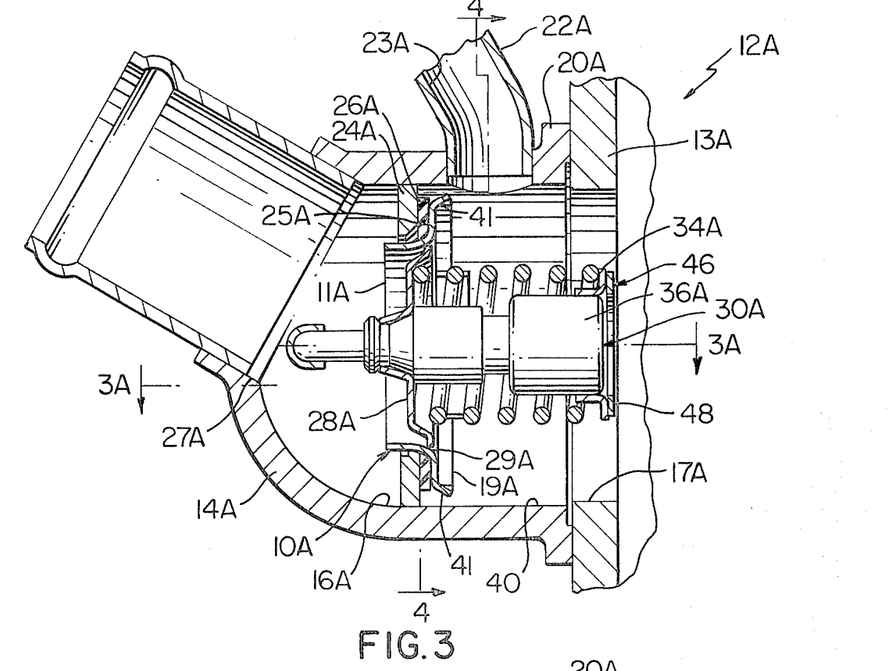
FIG. 3 is a view similar to FIG. 1 and illustrates the improved vehicle type thermostat of this invention as illustrated in FIG. 2 assembled in the vehicle engine cooling system of this invention.
Figure 3A:
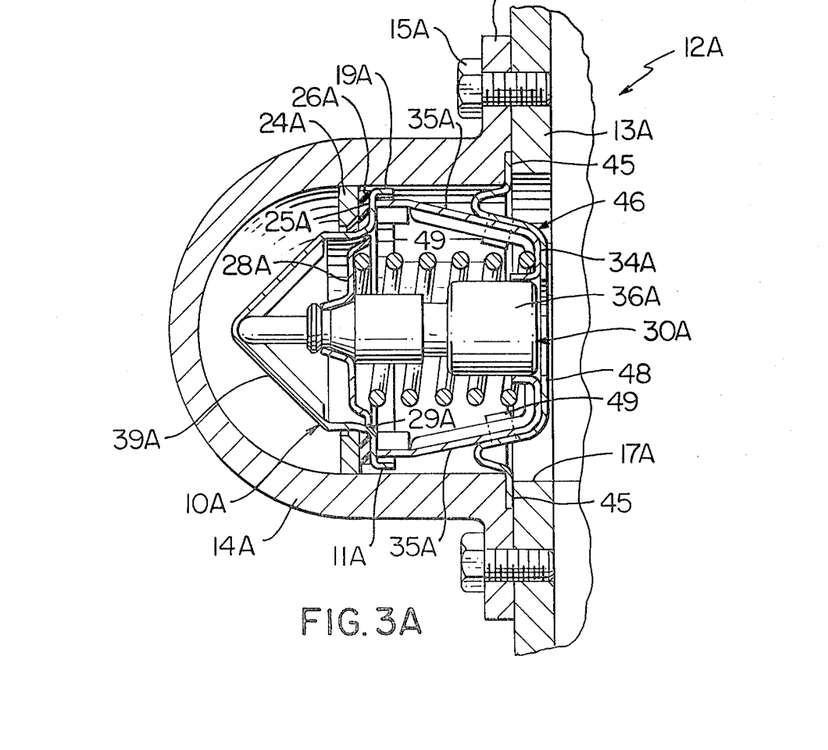
FIG. 3A is a cross-sectional view taken on line 3A—3A of FIG. 3.
Figure 4:
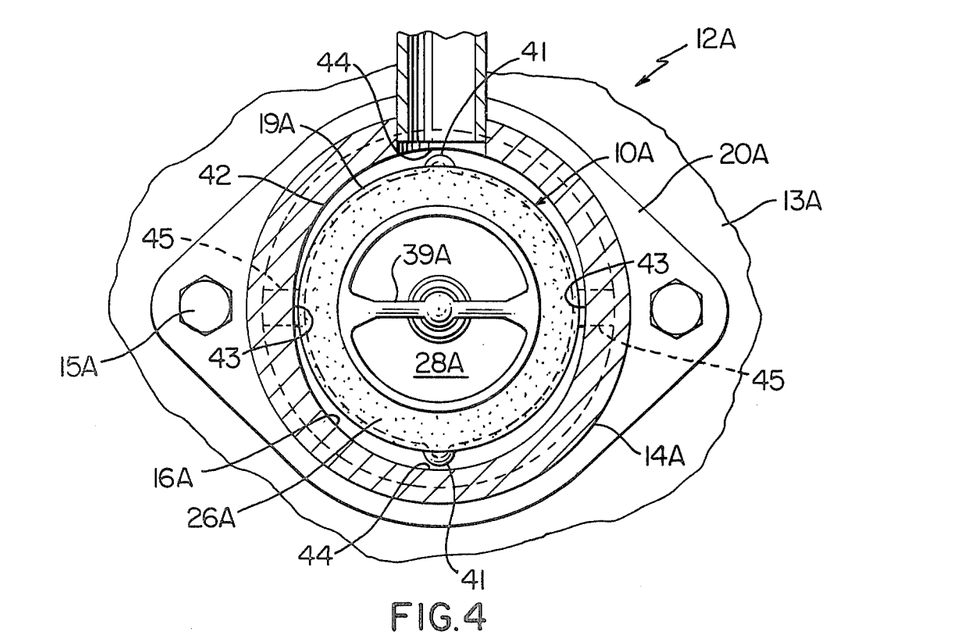
FIG. 4 is a fragmentary cross-sectional view taken on line 4—4 of FIG. 3 and illustrates one step in the method of this invention for assembling the improved vehicle type thermostat of this invention in the outlet housing means of the engine cooling system of FIG. 3.
Figure 5:
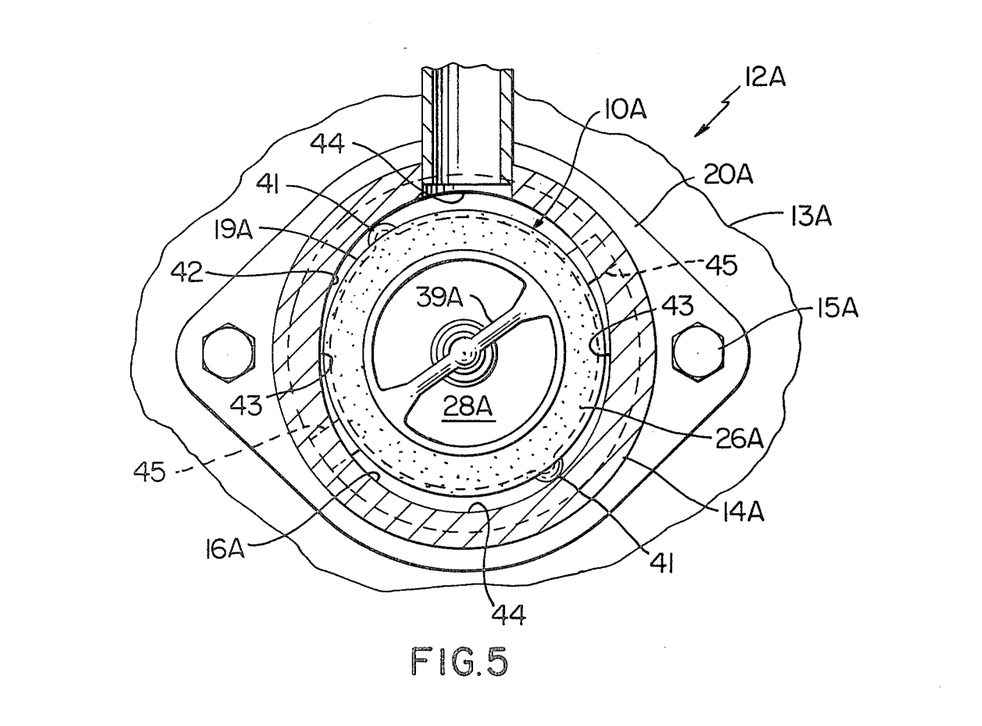
FIG. 5 is a view similar to FIG. 4 and illustrates the final step for positioning the vehicle type thermostat in the outlet housing of the engine cooling system of FIG. 3.

Accordingly, reference is now made to FIGS. 2, 3 and 3A wherein the improved thermostat of this invention is generally indicated by the reference numeral 10A and parts thereof as well as parts of the system 12A in FIGS. 3-5 that are similar to like parts of the thermostat 10 and system 12 of FIG. 1 are indicated by like reference numerals followed by the reference letter "A".

As illustrated in FIGS. 2, 3 and 3A, it can be seen that the thermostat construction 10A of this invention has the housing section 19A of the housing means 11A formed as a relatively short skirt that is substantially cylindrical while still defining the annular shoulder 25A for receiving the resilient sealing gasket means 26A thereon which will seal against the annular shoulder 24A of the outlet housing means 14A to fully block fluid flow from the engine block means 13A to the left hand end portion 27A of the passage means 16A of the outlet housing 14A for the purpose previously described.

However, it can also readily be seen in FIG. 3 that the portion 40 of the passage means 16A of the outlet housing 14A to the right of the annular shoulder 24A thereof is fully opened to the passage 17A of the engine block means 13A so that coolant from the engine block means 13A is permitted to flow to the passage means 23A of the bypass conduit 22A regardless of the rotational position of the thermostat 10A as the thermostat 10A does not have any means that are required to be oriented relative to the passage 23A of the bypass conduit 22A as is required by the openings 21 of the thermostat 10 previously described.

Nevertheless, the rotational position of the thermostat 10A is readily rotationally oriented in the outlet housing 14A for any other desired purpose, such as for disposing the spring retainer strap means 35A, as well as the piston strap means 39A, in the most beneficial and thereby least fluid flow restricting position thereof in the outlet housing 14A.

This rotational orienting feature of the thermostat 10A of this invention is provided by a pair of diametrically disposed abutments 41 integrally formed on the short cylindrical skirt 19A of the housing means 11A by a simple die deforming operation on the housing skirt 19A during the forming thereof in a single operation which does not thereafter require other multiple forming operations as is required by the relatively long cylindrical skirt 19 of the thermostat 10 previously described.

As illustrated in FIGS. 4 and 5, the passage 16A of the outlet housing 14A has a substantially oval cross-sectioned opening 42 wherein the horizontal diameter of the opening 42 as illustrated in FIGS. 4 and 5 is the smallest diameter of the oval opening 42 as defined by the opposed surface means 43 of the outlet housing means 14A. Conversely, the vertical diameter of the opening 42 as illustrated in FIGS. 4 and 5 is defined by the largest diameter of the opening 42 and is defined between opposed surface means 44 of the outlet housing 14A.

The oval opening 42 of the outlet housing 14A has the opposed surface means 43 and 44 thereof so shaped that the diameter between the pair of diametrically disposed abutments 41 formed on the short cylindrical skirt 19A of the housing means 11A of the thermostat 10A is smaller than the major diameter between the opposed surfaces 44 of the outlet housing 14A and is larger than the minor diameter between the opposed surfaces 43 of the outlet housing 14A.

In this manner, the thermostat 10A must be inserted in the opening 42 of the outlet housing 14A with the abutments 41 thereof being generally disposed between the opposed surface means 44 of the opening 42 as illustrated in FIG. 4 and after the resilient gasket 26A being carried thereby is pushed against the shoulder means 24A of the outlet housing 14A, the installer of the thermostat 10A rotates the thermostat 10A in either a clockwise or counterclockwise direction in FIGS. 4 and 5 until the abutment means 41 thereof interference fit against the opposed surface means 43 of the oval opening 42 in the manner illustrated in FIG. 5 to thereby not only rotationally orient the thermostat 10 in the opening 42 so that the strap means 35A and/or 39A thereof will be placed in the desired least fluid flow retarding position thereof, but also the thermostat 10A will be held from further rotation relative to the outlet housing 14A by the interference fitting of the abutment means 41 of the thermostat 10A with the opposed surface means 43 of the outlet housing 14A.

After the thermostat 10A has been installed in the outlet housing 14A in the manner previously described, the outlet housing 14A then is bolted to the engine block means 13A by the bolt means 15A in the manner illustrated in FIG. 3A wherein opposed legs 45 of a positioning member 46 of the thermostat 10A of this invention is sandwiched between the engine block means 13A and the recessed flange means 20A of the outlet housing 14A to firmly hold the thermostat 10A in sealing relation against the shoulder 24A of the outlet housing 14A and to prevent the thermostat 10A from passing into the opening 17A of the engine block means 13A whereby the thermostat 10A is held in the oriented rotational position thereof in the engine cooling system 12A.

Figure 6:
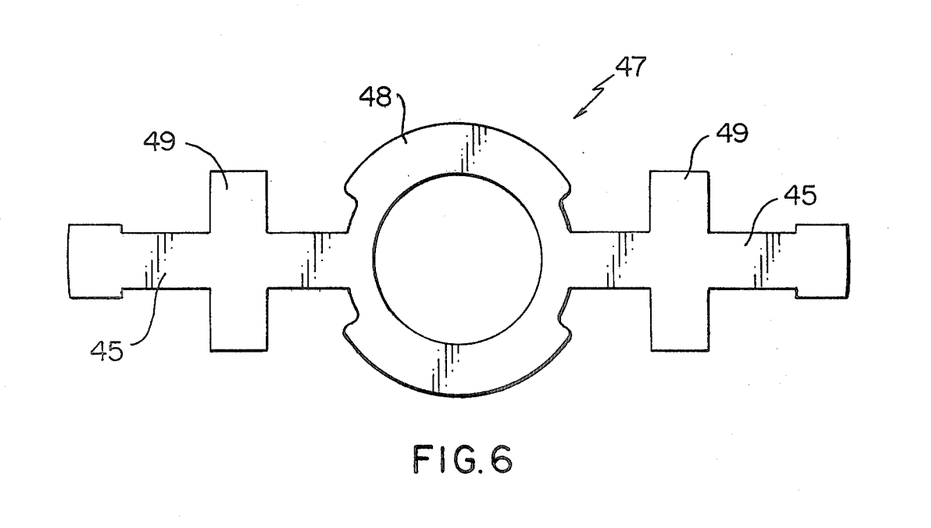
FIG. 6 is a top view of a blank for forming a positioning member for the improved vehicle type thermostat of this invention.

In particular, the retaining or positioning member 46 of this invention can be formed from a one-piece flat blank that is generally indicated by the reference numeral 47 in FIG. 6 by any suitable stamping operation to be subsequently formed into the bent configuration as illustrated in FIGS. 2 and 3A by a simple die forming operation or the like whereby the two legs 45 are integrally interconnected to a central annular section 48 that overlies the annular spring retainer portion 34A so that the cylinder means 36A of the temperature responsive device 30A can move therethrough during opening movement of the valve member 28A of the thermostat 10A in the manner previously described.

The opposed legs 45 of the retaining or positioning member 46 each has a pair of clip means or tabs 49 which are adapted to be respectively folded about the spring retainer straps 35A in the manner illustrated in FIG. 3A to firmly hold the positioning member 46 thereto and thereby be carried by the thermostat 10A to permit the same to be positioned in the opening 42 of the outlet housing 14A in the manner previously described whereby it can be seen that the positioning member 46 of this invention performs the same function as the annular flange 18 of the long cylindrical housing skirt 19 of the thermostat 10, that is, to hold the thermostat 10A in the desired assembled position in the engine cooling system 12A of FIGS. 3 and 3A.

Further, it can be seen that the legs 45 of the positioning member 46 of this invention are so arranged that the same are substantially parallel with the adjacent spring retaining straps 35A of the housing means 11A of the thermostat 10A so that the legs 45 of the positioning member 46 do not hinder the fluid flow through the thermostat 10A anymore than the spring straps 35A impede such flow as the legs 45 are substantially superimposed on the spring retainer straps 35A.

Therefore, it can be seen that in the operation of the thermostat 10A of this invention, the thermostat 10A can be readily inserted into the oval opening 42 of the outlet housing 14A by having the abutment means 41 thereof disposed generally adjacent the opposed surfaces 44 of the opening 42 in the manner illustrated in FIG. 4 and when the gasket 26A thereof engages against the internal shoulder 24A of the housing means 14A, the installer rotates the thermostat 10A in either direction to interference fit the abutment means 41 against the opposed surface means 43 of the housing 14A to rotationally orient the thermostat 10A therein and prevent further rotation thereof. Thereafter, the outlet housing 14A is bolted to the engine block means 13A by the bolts 15A and the positioning legs 45 of the positioning member 46 carried by the spring retainer straps 35A are sandwiched between the engine block means 13A and the flange 20A of the outlet housing 14A to hold the thermostat 10A in its sealing relation against the internal shoulder 24A of the outlet housing 14A as well as in the desired rotational position thereof that is determined by the abutments 41 engaging against the opposed surfaces 43 of the outlet housing 14A as previously described.

Subsequently, the valve member 28A is adapted to move relative to the valve seat surface means 29A under the control of the temperature responsive device 30 in the manner previously described while coolant from the engine block means 13A is adapted to continuously flow to the passage 23A of the bypass conduit 22A regardless of the opening and closing movement of the valve member 28A to provide for operation of the heater for the passenger cabin of the vehicle containing the system 12A as previously described.

Therefore, it can be seen that this invention not only provides an improved vehicle type thermostat, but also this invention provides an improved vehicle engine cooling system as well as methods for making such a thermostat and engine cooling system.

While the forms and methods of this invention now preferred have been illustrated and described as required by the Patent Statute, it is to be understood that other forms and method steps can be utilized and still fall within the scope of the appended claims.

What is claimed is:

1. In a vehicle type thermostat having a housing means provided with a valve seat that is controlled by a movable valve member which is interconnected to a temperature responsive device that is carried by said housing means, the improvement wherein said housing means has interference fit positioning means thereon for rotationally orienting said housing means in a vehicle engine cooling system whereby said thermostat can be disposed in the desired rotational position in said cooling system, said housing means having opposed ends and includes a relatively short annular skirt disposed intermediate said opposed ends and having said positioning means thereon, said housing means including a spring retainer having an annular spring seat portion defining one of said opposed ends of said housing means and having a pair of strap portions respectively extending from said spring seat portion to adjacent said annular skirt, and a retaining member for positioning said thermostat in an outlet housing of an engine cooling system and being secured to said strap portions.

2. A vehicle type thermostat as set forth in claim 1 wherein said retaining member has a pair of opposed legs respectively extending outwardly from said pair of strap portions to be received between said outlet housing and an engine block means of said engine cooling system.

3. A vehicle type thermostat as set forth in claim 1 wherein said interference fit positioning means comprises a plurality of abutments on said annular skirt.

4. A vehicle type thermostat as set forth in claim 3 wherein said abutments are integral with said annular skirt.

5. A vehicle type thermostat as set forth in claim 4 wherein said abutments each has an arcuate cross-sectional configuration.

6. A vehicle type thermostat as set forth in claim 1 wherein said annular skirt defines an annular shoulder for receiving an annular sealing gasket to seal said housing means in an outlet housing.

7. In a vehicle type thermostat having a housing means provided with a valve seat that is controlled by a movable valve member which is interconnected to a temperature responsive device that is carried by said housing means, the improvement wherein said housing means has interference fit positioning means thereon for rotationally orienting said housing means in a vehicle engine cooling system whereby said thermostat can be disposed in the desired rotational position in said cooling system, said housing means having opposed ends and including a relatively short annular skirt disposed intermediate said opposed ends and having said positioning means thereon, said housing means including a spring retainer having an annular spring seat portion defining one of said opposed ends of said housing means and having a pair of strap portions respectively extending from said spring seat portion to adjacent said annular skirt, and a retaining member for positioning said thermostat in an outlet housing of an engine cooling system and being secured to said strap portions, said retaining member having a pair of opposed legs respectively extending outwardly from said pair of strap portions to be received between said outlet housing and an engine block means of said engine cooling system, said retaining member having clip means securing said retaining member to said strap portions.

8. A vehicle type thermostat as set forth in claim 7 wherein each said clip means of said retaining member comprises a pair of tabs folded about its respective strap portion.

9. A vehicle type thermostat as set forth in claim 8 wherein said retaining member comprises a one-piece structure.

10. In a vehicle engine cooling system having an outlet housing secured to an engine block means and provided with an opening receiving a vehicle type thermostat having a housing means provided with a valve seat that is controlled by a movable valve member which is interconnected to a temperature responsive device that is carried by said housing means, the improvement wherein said opening of said outlet housing has a substantially oval cross-sectional configuration defined by opposed pairs of surface means of said outlet housing that respectively define a major diameter and a minor diameter of said oval opening therebetween, said housing means having interference fit positioning means thereon engaging said pair of opposed surface means of said outlet housing that define said minor diameter of said oval opening thereof for rotationally orienting said housing means in said opening of said outlet housing whereby said thermostat can be disposed in the desired rotational position in said cooling system, said housing means having opposed ends and including a relatively short annular skirt disposed intermediate said opposed ends and having said positioning means thereon, said housing means including a spring retainer having an annular spring seat portion defining one of said opposed ends of said housing means and having a pair of strap portions respectively extending from said spring seat portion to adjacent said annular skirt, and a retaining member positioning said thermostat in said outlet housing and being secured to said strap portions.

11. A vehicle engine cooling system as set forth in claim 10 wherein said retaining member has a pair of opposed legs respectively extending outwardly from said pair of strap portions and being received between said outlet housing and said engine block means.

12. A vehicle engine cooling system as set forth in claim 10 wherein said interference fit positioning means comprises a plurality of abutments on said annular skirt.

13. A vehicle engine cooling system as set forth in claim 12 wherein said abutments are integral with said annular skirt.

14. A vehicle engine cooling system as set forth in claim 13 wherein said abutments each has an arcuate cross-sectional configuration.

15. A vehicle engine cooling system as set forth in claim 10 wherein said outlet housing has an annular shoulder in said oval opening thereof, said annular skirt defining an annular shoulder, and a sealing gasket disposed between said shoulders of said outlet housing and said annular skirt to seal said housing means in said outlet housing.

16. A vehicle engine cooling system as set forth in claim 12 wherein said abutments comprises a pair of diametrically disposed abutments defining a diameter therebetween that is larger than said minor diameter of said oval opening.

17. A vehicle engine cooling system as set forth in claim 16 wherein said pair of diametrically disposed abutments define a diameter therebetween that is smaller than said major diameter of said oval opening.

18. In a vehicle engine cooling system having an outlet housing secured to an engine block means and provided with an opening receiving a vehicle type thermostat having a housing means provided with a valve seat that is controlled by a movable valve member which is interconnected to a temperature responsive device that is carried by said housing means, the improvement wherein said opening of said outlet housing has a substantially oval cross-sectional configuration defined by opposed pairs of surface means of said outlet housing that respectively define a major diameter and a minor diameter of said oval opening therebetween, said housing means having interference fit positioning means thereon engaging said pair of opposed surface means of said outlet housing that define said minor diameter of said oval opening thereof for rotationally orienting said housing means in said opening of said outlet housing whereby said thermostat can be disposed in the desired rotational position in said cooling system, said housing means having opposed ends and including a relatively short annular skirt disposed intermediate said opposed ends and having said positioning means thereon, said housing means including a spring retainer having an annular spring seat portion defining one of said opposed ends of said housing means and having a pair of strap portions respectively extending from said spring seat portion to adjacent said annular skirt, and a retaining member positioning said thermostat in said outlet housing and being secured to said strap portions, said retaining member having a pair of opposed legs respectively extending outwardly from said pair of strap portions and being received between said outlet housing and said engine block means, said retaining member having clip means securing said retaining member to said strap portions.

19. A vehicle engine cooling system as set forth in claim 18 wherein each said clip means of said retaining member comprises a pair of tabs folded about its respective strap portion.

20. A vehicle engine cooling system as set forth in claim 19 wherein said retaining member comprises a one-piece structure.

21. In a method of making a vehicle type thermostat having a housing means provided with a valve seat that is controlled by a movable valve member which is interconnected to a temperature responsive device that is carried by said housing means, the improvement comprising the steps of forming said housing means with interference fit positioning means thereon for rotationally orienting said housing means in a vehicle engine cooling system whereby said thermostat can be disposed in the desired rotational position in said cooling system, forming said housing means to include a relatively short annular skirt disposed intermediate the opposed ends of said housing means and having said positioning means thereon, forming said housing means to include a spring retainer having an annular spring seat portion defining one of said opposed ends of said housing means and having a pair of strap portions respectively extending from said spring seat portion to adjacent said annular skirt, and securing a retaining member to said strap portions for positioning said thermostat in an outlet housing of an engine cooling system.

22. A method of making a vehicle type thermostat as set forth in claim 21 and including the step of forming said retaining member with a pair of opposed legs respectively extending outwardly from said pair of strap portions to be received between said outlet housing and an engine block means of said engine cooling system.

23. A method of making a vehicle type thermostat as set forth in claim 21 and including a step of forming said interference fit positioning means to comprise a plurality of abutments on said annular skirt.

24. A method of making a vehicle type thermostat as set forth in claim 23 and including the step of forming said abutments to be integral with said annular skirt.

25. A method of making a vehicle type thermostat as set forth in claim 24 and including the step of forming said abutments to each have an arcuate cross-sectional configuration.

26. A method of making a vehicle type thermostat as set forth in claim 21 and including the step of forming said annular skirt to define an annular shoulder for receiving an annular sealing gasket to seal said housing means is an outlet housing.

27. In a method of making a vehicle type thermostat having a housing means provided with a valve seat that is controlled by a movable valve member which is interconnected to a temperature responsive device that is carried by said housing means, the improvement comprising the steps of forming said housing means with interference fit positioning means thereon for rotationally orienting said housing means in a vehicle engine cooling system whereby said thermostat can be disposed in the desired rotational position in said cooling system, forming said housing means to include a relatively short annular skirt disposed intermediate the opposed ends of said housing means and having said positioning means thereon, forming said housing means to include a spring retainer having an annular spring seat portion defining one of said opposed ends of said housing means and having a pair of strap portions respectively extending from said spring seat portion to adjacent said annular skirt, securing a retaining member to said strap portions for positioning said thermostat in an outlet housing of an engine cooling system, forming said retaining member with a pair of opposed legs respectively extending outwardly from said pair of strap portions to be received between said outlet housing and an engine block means of said engine cooling system, and forming said retaining member with clip means for securing said retaining member to said strap portions.

28. A method of making a vehicle type thermostat as set forth in claim 27 and including the step of forming each said clip means of said retaining member to comprise a pair of tabs folded about its respective strap portion.

29. A method of making a vehicle type thermostat as set forth in claim 28 and including the step of forming said retaining member as a one-piece structure.

30. In a method of making a vehicle engine cooling system having an outlet housing secured to an engine block means and provided with an opening receiving a vehicle type thermostat having a housing means provided with a valve seat that is controlled by a movable valve member which is interconnected to a temperature responsive device that is carried by said housing means, the improvement comprising the steps of forming said opening of said outlet housing to have a substantially oval cross-sectional configuration defined by opposed pairs of surface means of said outlet housing that respectively define a major diameter and a minor diameter of said oval opening therebetween, forming said housing means with interference fit positioning means thereon for engaging said pair of opposed surface means of said outlet housing that define said minor diameter of said oval opening thereof for rotationally orienting said housing means in said opening of said outlet housing whereby said thermostat can be disposed in the desired rotational position in said cooling system, forming said housing means to include a relatively short annular skirt disposed intermediate opposed ends of said housing means and have said positioning means thereof, forming said housing means to include a spring retainer having an annular spring seat portion defining one of said opposed ends of said housing means and having a pair of strap portions respectively extending from said spring seat portion to adjacent said annular skirt, and securing a retaining member to said strap portions for positioning said thermostat in said outlet housing.

31. A method of making a vehicle engine cooling system as set forth in claim 30 and including the step of forming said retaining member with a pair of opposed legs respectively extending outwardly from said pair of strap portions and being received between said outlet housing and said engine block means.

32. A method of making a vehicle engine cooling system as set forth in claim 30 and including the step of forming said interference fit positioning means to comprise a plurality of abutments on said annular skirt.

33. A method of making a vehicle engine cooling system as set forth in claim 32 and including the step of forming said abutments to be integral with said annular skirt.

34. A method of making a vehicle engine cooling system as set forth in claim 33 and including the step of forming said abutments to each have an arcuate cross-sectional configuration.

35. A method of making a vehicle engine cooling system as set forth in claim 30 and including the steps of forming said outlet housing with an annular shoulder in said oval opening thereof, forming said annular skirt to define an annular shoulder, and disposing a sealing gasket between said shoulders of said outlet housing and said annular skirt to seal said housing means in said outlet housing.

36. A method of making a vehicle engine cooling system as set forth in claim 32 and including the step of forming said abutments to comprise a pair of diametrically disposed abutments defining a diameter therebetween that is larger than said minor diameter of said oval opening.

37. A method of making a vehicle engine cooling system as set forth in claim 36 and including the step of forming said pair of diametrically disposed abutments to define a diameter therebetween that is smaller than said major diameter of said oval opening.

38. In a method of making a vehicle engine cooling system having an outlet housing secured to an engine block means and provided with an opening receiving a vehicle type thermostat having a housing means provided with a valve seat that is controlled by a movable valve member which is interconnected to a temperature responsive device that is carried by said housing means, the improvement comprising the steps of forming said opening of said outlet housing to have a substantially oval cross-sectional configuration defined by opposed pairs of surface means of said outlet housing that respectively define a major diameter and a minor diameter of said oval opening therebetween, forming said housing means with interference fit positioning means thereon for engaging said pair of opposed surface means of said outlet housing that define said minor diameter of said oval opening thereof for rotationally orienting said housing means in said opening of said outlet housing whereby said thermostat can be disposed in the desired rotational position in said cooling system, forming said housing means to include a relatively short annular skirt disposed intermediate opposed ends of said housing means and have said positioning means thereon, forming said housing means to include a spring retainer having an annular spring seat portion defining one of said opposed ends of said housing means and having a pair of strap portions respectively extending from said spring seat portion to adjacent said annular skirt, and securing a retaining member to said strap portions for positioning said thermostat in said outlet housing, forming said retaining member with a pair of opposed legs respectively extending outwardly from said pair of strap portions and being received between said outlet housing and said engine block means, and forming said retaining member with clip means that secures said retaining member to said strap portions.

39. A method of making a vehicle engine cooling system as set forth in claim 38 and including the step of forming each said clip means of said retaining member to comprise a pair of tabs folded about its respective strap portion.

40. A method of making a vehicle engine cooling system as set forth in claim 39 and including the step of forming said retaining member to comprise a one-piece structure.

* * * * *